United States Patent [19]
Adam

[11] 4,117,940
[45] Oct. 3, 1978

[54] SIDE LOADING-REAR DISCHARGING TRAILER FOR MULTIPLE ROUND BALES

[76] Inventor: Robert G. Adam, Okeene, Okla. 73763

[21] Appl. No.: 782,439

[22] Filed: Mar. 29, 1977

[51] Int. Cl.² .............................................. B60P 1/48
[52] U.S. Cl. .............................. 214/1 HH; 214/77 R; 214/80; 214/518
[58] Field of Search ................. 214/77 R, 78, 80, 518, 214/132, 144, 149, 671, 672, 674, DIG. 4, 1 HH

[56] References Cited
U.S. PATENT DOCUMENTS

| | | | |
|---|---|---|---|
| 3,880,305 | 4/1975 | Van Polen | 214/147 G |
| 3,924,765 | 12/1975 | Hostetler | 214/80 |

*Primary Examiner*—Robert G. Sheridan
*Attorney, Agent, or Firm*—Clarence A. O'Brien; Harvey B. Jacobson

[57] ABSTRACT

An elongated horizontal wheeled frame is provided for receiving hay bales thereon and the frame is adapted to be moved longitudinally over the ground. One end of an elongated generally horizontal arm is pivotally supported from one side of the frame for horizontal swinging of the arm about an upstanding axis relative to the frame between a first position with the arm projecting outwardly from the corresponding side of the frame and a second position with the arm swung forwardly to a position closely paralleling the frame. The free end portion of the arm includes a hay bale engaging structure which projects outwardly from the side of the arm opposing the frame when the arm is in the second position thereof and the hay bale engaging structure is adapted to supportively engage a ground supported hay bale toward which the arm is laterally advanced when it is in the first position thereof as the frame is forwardly advanced over the ground. The hay bale engaging structure is supported from the arm for vertical shifting of at least the outer portion of the hay bale engaging structure relative to the arm and the frame, at a point spaced forwardly from the axis of oscillation of the arm a distance substantially equal to the spacing of the hay bale engaging structure along the arm from the aforementioned axis, is structured to receive thereon a hay bale supported from the hay bale engaging structure when the outer portion thereof is in an elevated position and the arm is swung forwardly from the first position thereof to the second position thereof.

12 Claims, 15 Drawing Figures

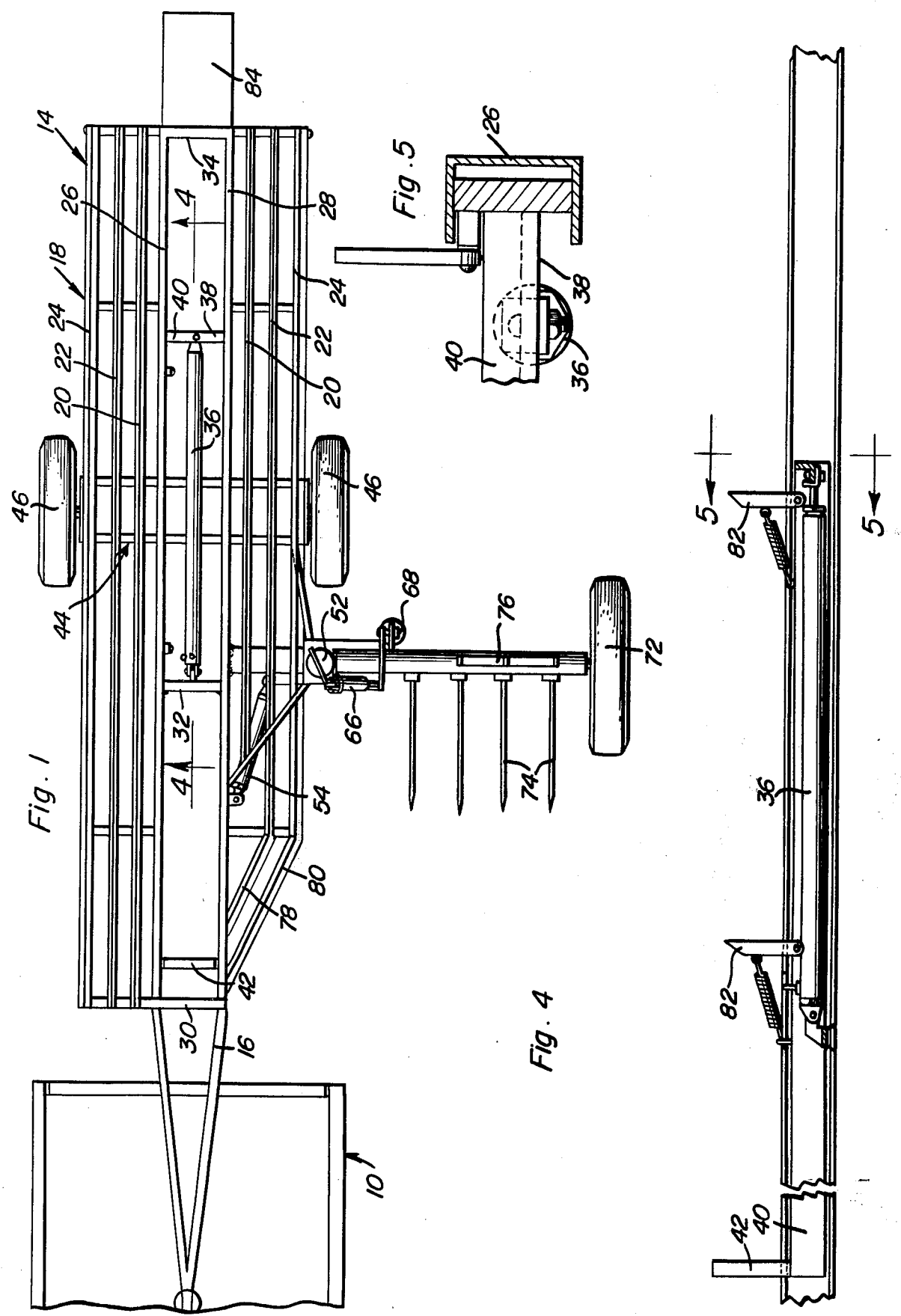

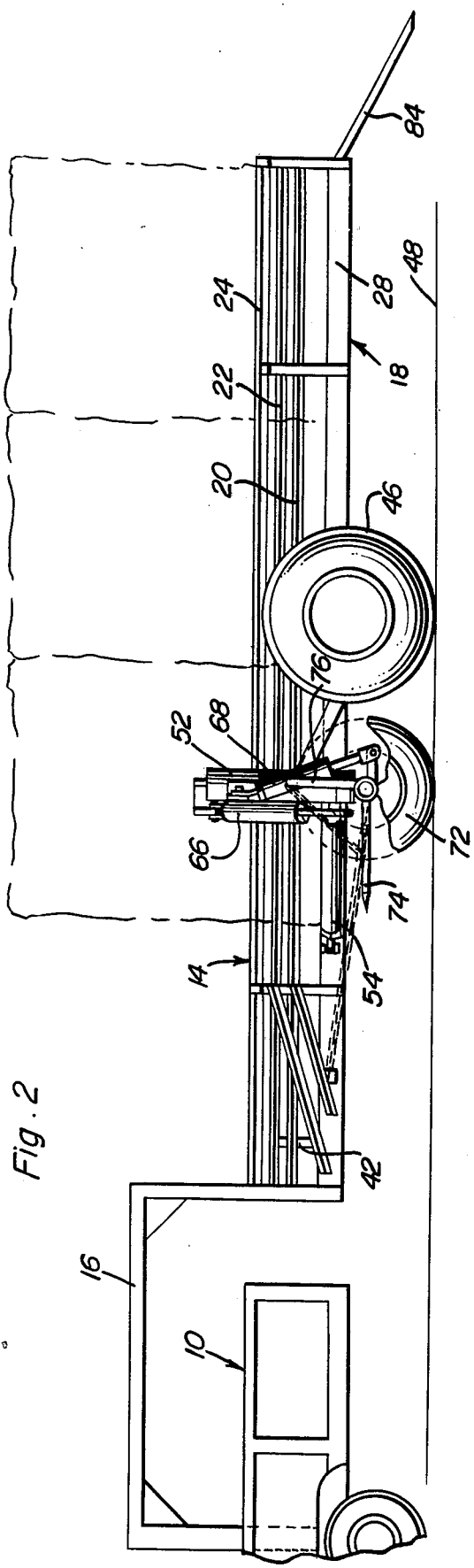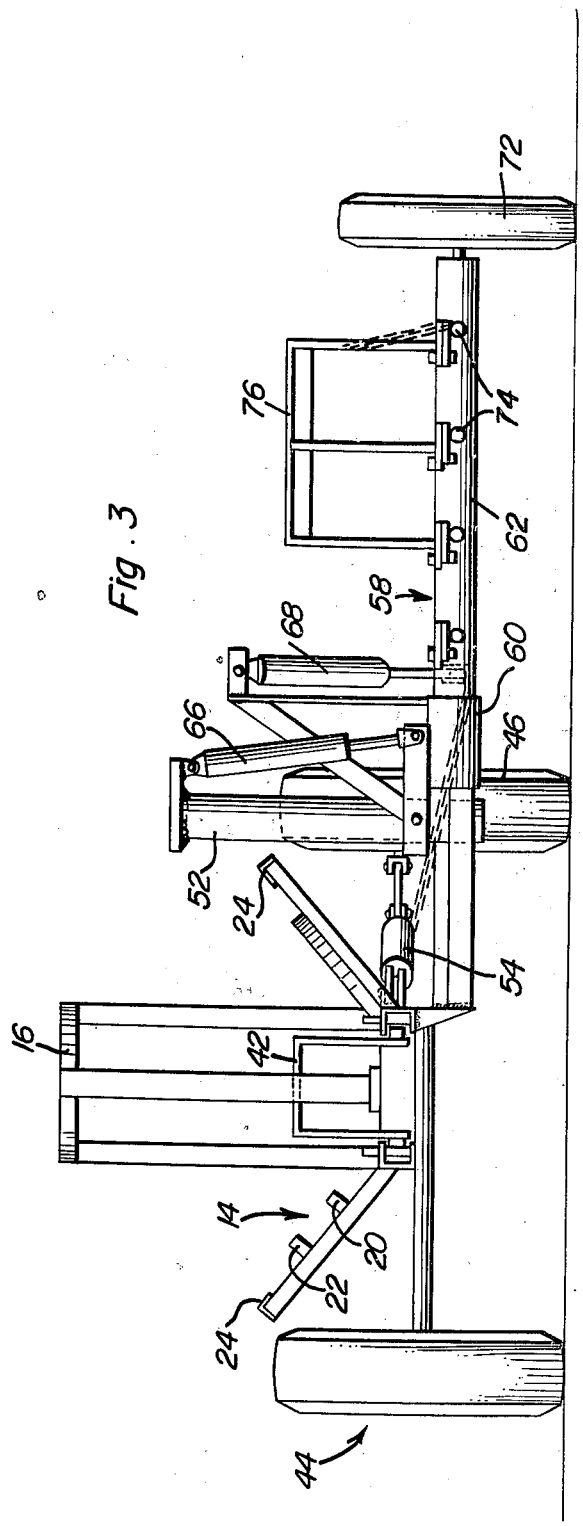

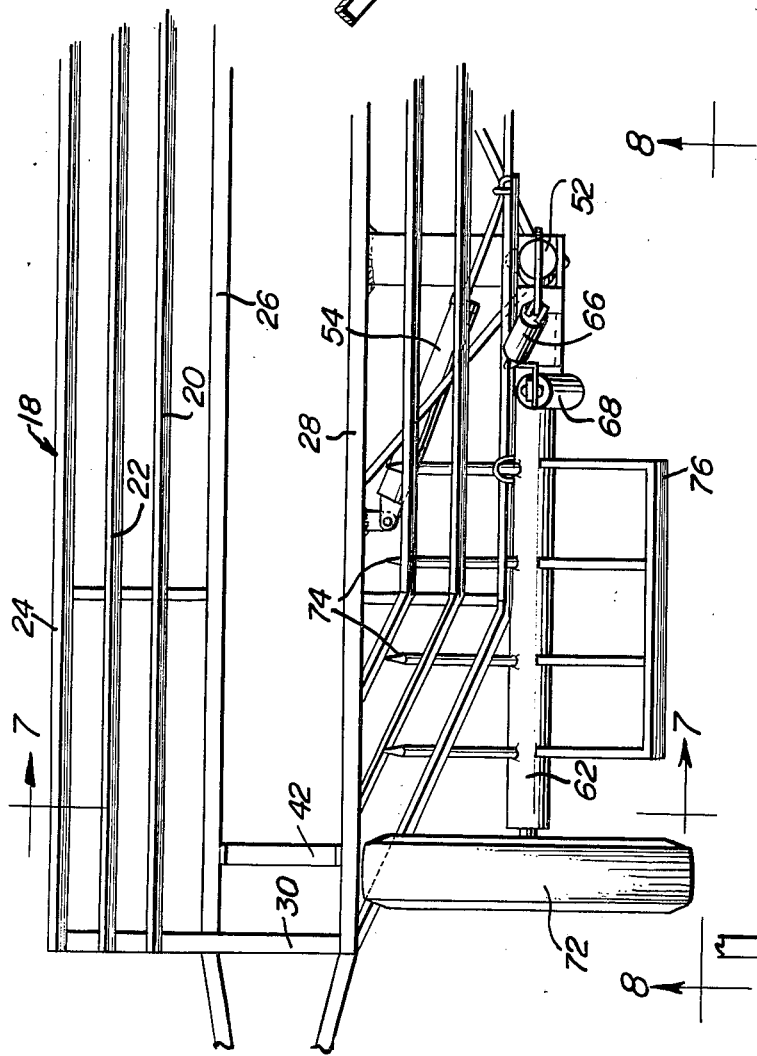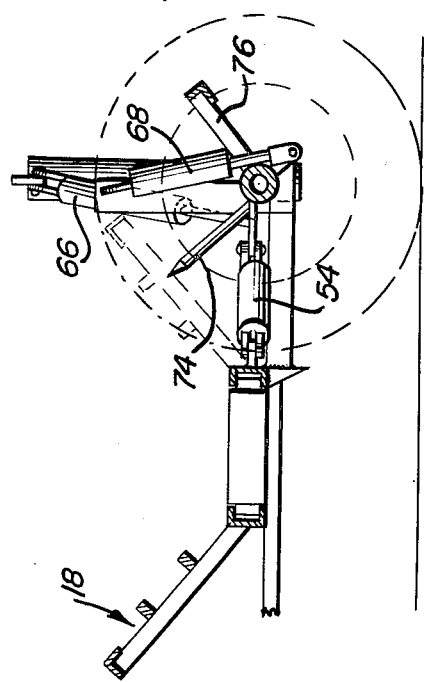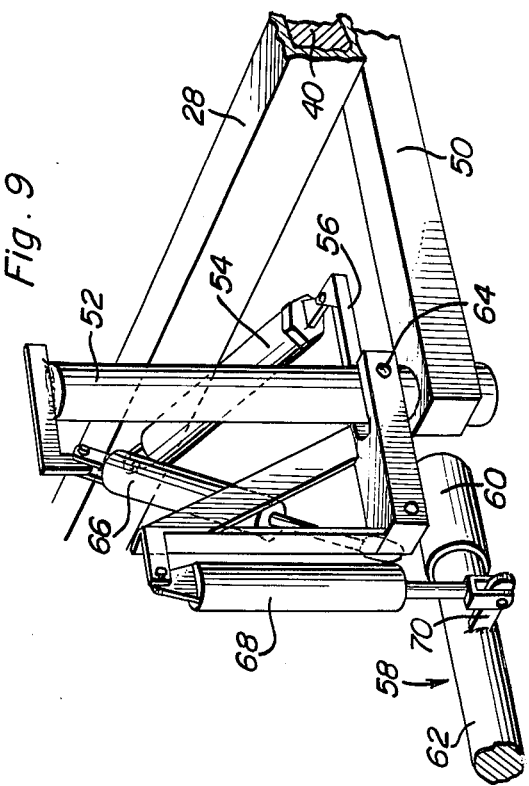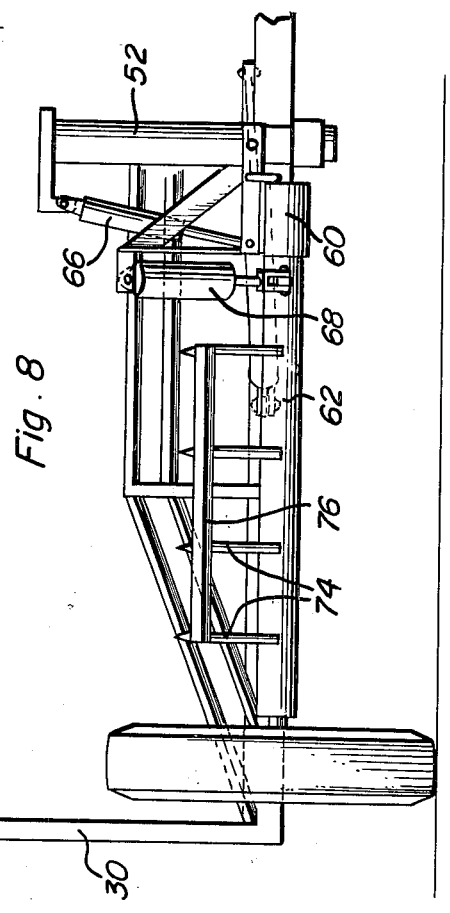

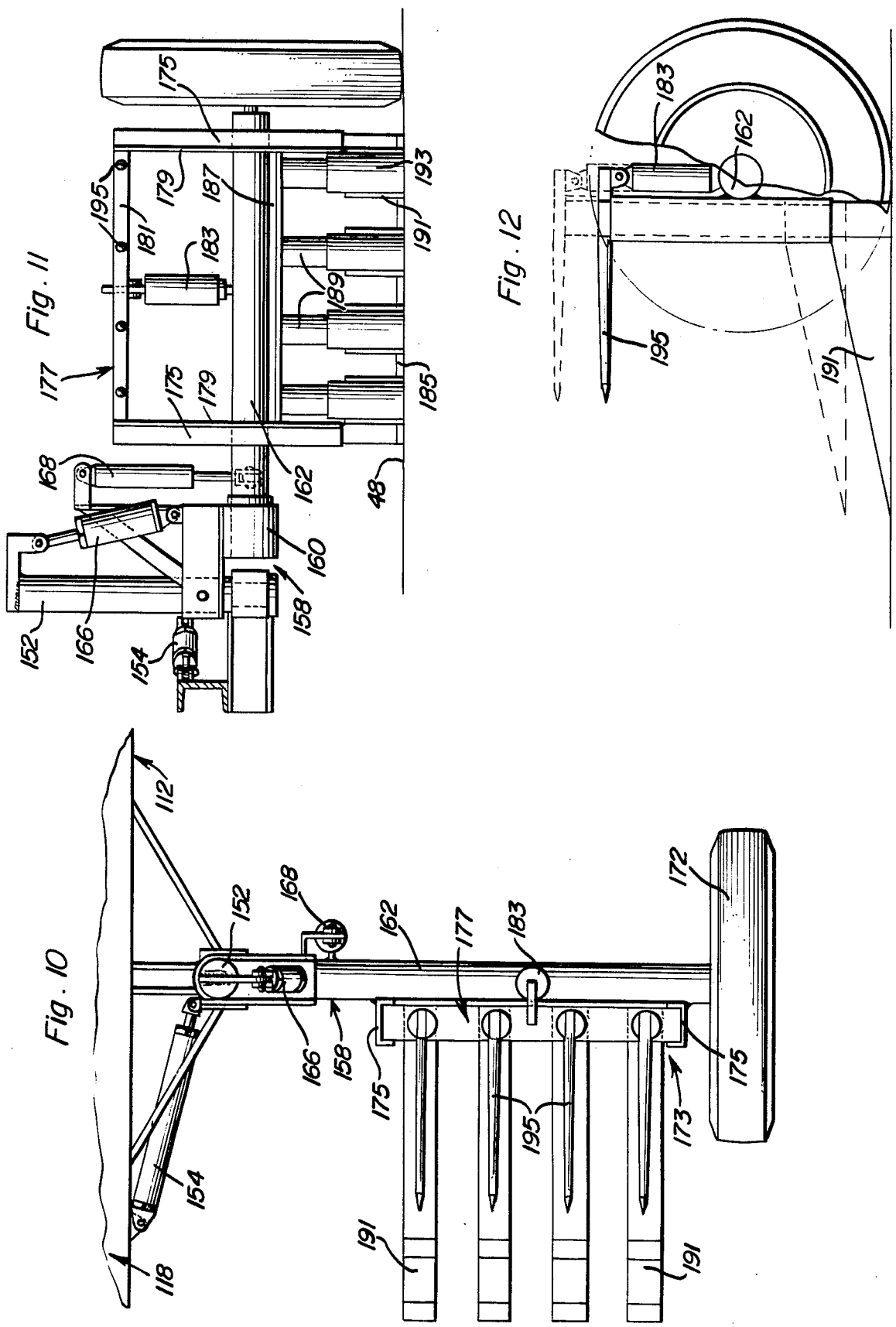

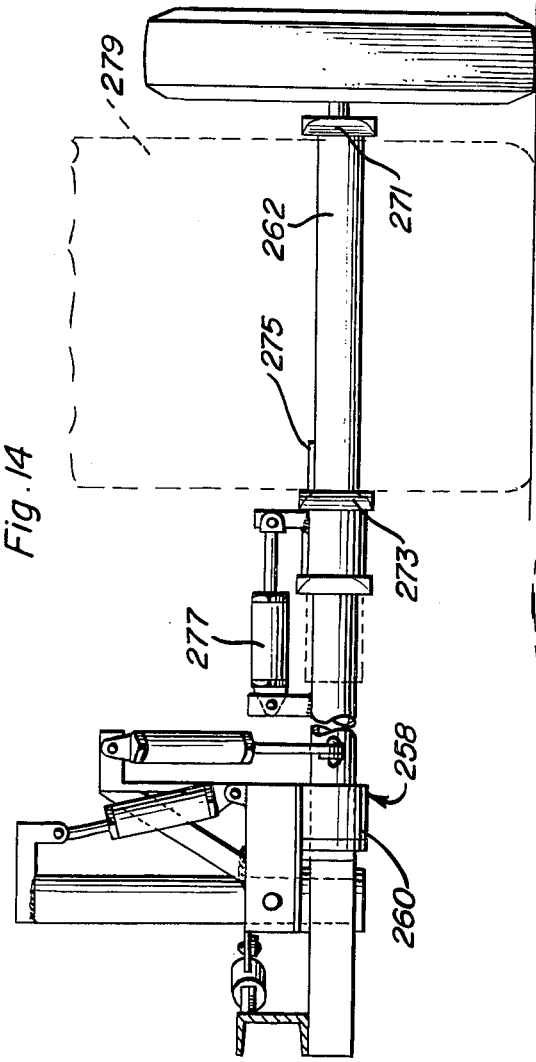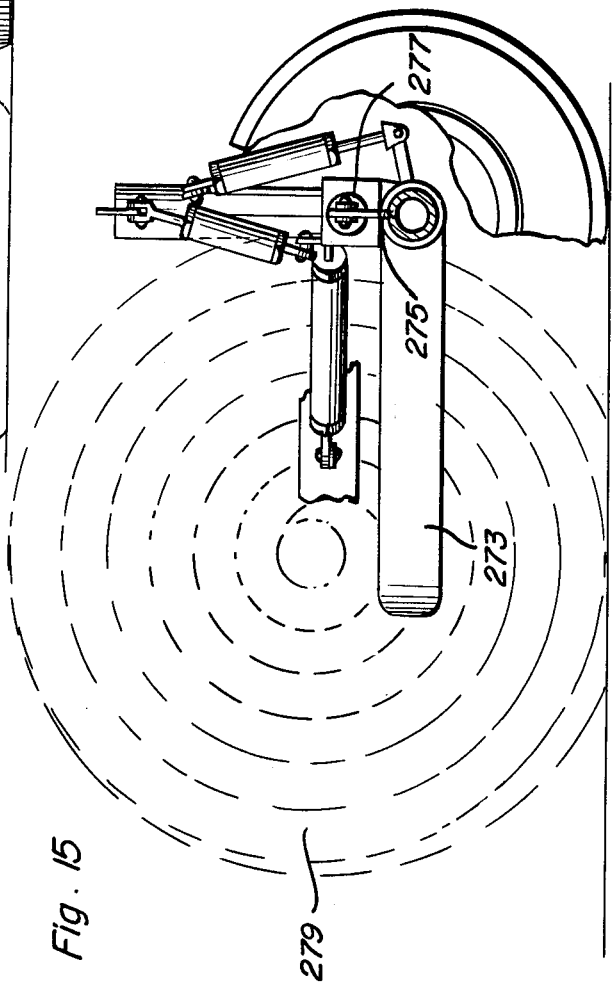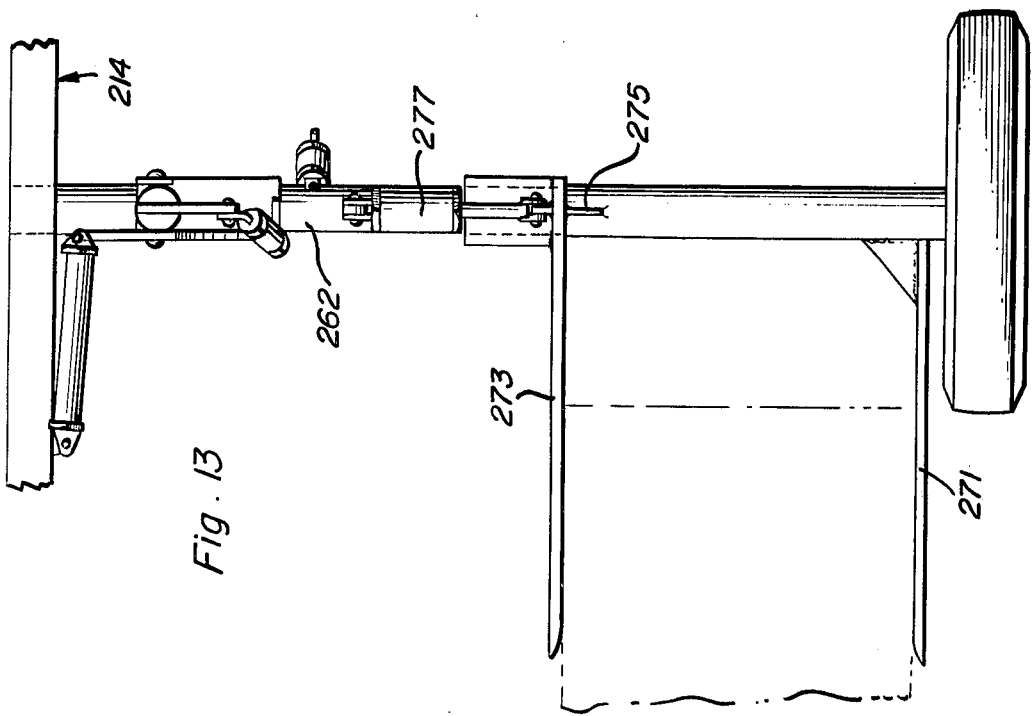

SIDE LOADING-REAR DISCHARGING TRAILER FOR MULTIPLE ROUND BALES

BACKGROUND OF THE INVENTION

Various forms of ground vehicles have been provided for picking up and supporting round hay bales. However, most of these structures are limited to a capacity of picking up and transporting only single bales with the result that the ground vehicles must waste considerable time in transit back and forth between a field in which round hay bales are disposed and a storage point to which the round hay bales are to be transported. Accordingly, a need exists for a ground vehicle constructed in a manner whereby a plurality of round hay bales may be picked up from the ground and supported upon the ground vehicle for subsequent transport to a remote storage point.

Further, various forms of previous round hay bale pickup and transporting vehicles are constructed in a manner whereby the vehicle may not be forwardly advanced along a row of round hay bales and utilized to pickup a plurality of round hay bales independent of reversing or jockeying the vehicle each time a round hay bale is to be picked up. Therefore, a further need exists for a ground vehicle which may be quickly advanced along a row of ground supported round hay bales and utilized to pickup a plurality of hay bales in a manner requiring only straight line movement of the vehicle along the row of hay bales.

Examples of previously known devices for picking up and transporting hay bales or bundles are disclosed in U.S. Pat. Nos. 1,252,901, 2,722,793, 2,808,948, 3,877,595, 3,800,305, and 3,896,956.

BRIEF DESCRIPTION OF THE INVENTION

The trailer of the instant invention is constructed in a manner whereby it may be readily towed behind any suitable form of draft vehicle along a row of hay bales and includes structure projecting outwardly from one side of the trailer which may be utilized to engage and pickup hay bales disposed upon the ground toward which the hay bale pickup structure is advanced during forward movement of the trailer.

The trailer further includes structure whereby the picked up hay bales may be deposited on a forward portion of the trailer and subsequently displaced rearwardly therealong to provide a space in which to receive the next hay bale picked up from the ground. Also, the structure provided for displacing the hay bales rearwardly along the trailer is further operative to rearwardly discharge the hay bales from the rear end of the trailer at a storage point.

The main object of this invention is to provide a hay bale pickup and transporting device which may be readily pulled behind any suitable draft vehicle and utilized to pickup a plurality of cylindrical hay bales and to thereafter transport the plurality of hay bales to a storage point.

Yet another object of this invention is to provide an apparatus in accordance with the preceding object and constructed in a manner whereby the hay bales supported therefrom may be readily discharged at the storage point for the hay bales.

Another important object of this invention is to provide an apparatus which may be readily operated to pickup a plurality of cylindrical hay bales disposed along a generally straight path on the ground.

A final object of this invention is to be specifically enumerated herein is to provide an apparatus in accordance with the preceding objects and which will conform to conventional forms of manufacture, be of simple construction and easy to use, so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a top plan view of a first form of trailer constructed in accordance with the present invention;

FIG. 2 is a side elevational view of the assemblage illustrated in FIG. 1 with the upper portion of one of the wheels associated with the trailer broken away;

FIG. 3 is a front elevational view of the assemblage illustrated in FIGS. 1 and 2 and on somewhat of an enlarged scale;

FIG. 4 is an enlarged, fragmentary, longitudinal, vertical, sectional view taken substantially upon the plane indicated by the section line 4—4 of FIG. 1;

FIG. 5 is a fragmentary, enlarged, transverse, vertical, sectional view taken substantially upon the plane indicated by the section line 5—5 of FIG. 4;

FIG. 6 is a fragmentary, enlarged, top plan view of the forward portion of the trailer illustrated in FIG. 1 and with the bale pickup arm thereof in a position to support a hay bale which has just been picked up in position for deposit of the hay bale on the forward end of the trailer;

FIG. 7 is a fragmentary, transverse, vertical, sectional view taken substantially upon the plane indicated by the section line 7—7 of FIG. 6;

FIG. 8 is a fragmentary, side, elevational view taken substantially upon the plane indicated by the section line 8—8 of FIG. 6;

FIG. 9 is a fragmentary, enlarged, perspective view illustrating the plurality of fluid motors utilized in the actuation of the first form of trailer illustrated in FIGS. 1 through 8;

FIG. 10 is a fragmentary, top, plan view of a second form of trailer constructed in accordance with the present invention;

FIG. 11 is a fragmentary, front, elevational view of the assemblage illustrated in FIG. 10;

FIG. 12 is a fragmentary, side, elevational view of the assemblage illustrated in FIGS. 10 and 11 and with portions thereof broken away;

FIG. 13 is a fragmentary, top plan view of a third form of trailer constructed in accordance with the present invention;

FIG. 14 is a fragmentary, front elevational view of the assemblage illustrated in FIG. 13; and FIG. 15 is a fragmentary, side elevational view of the assemblage illustrated in FIGS. 13 and 14 and with portions of the support wheel for the pickup arm broken away.

DETAILED DESCRIPTION OF THE INVENTION

Referring now more specifically to the drawings, the numeral 10 generally designates a conventional form of draft vehicle to which the trailer of the instant invention, referred to in general by the reference numeral 14, is coupled by means of a gooseneck tongue 16. The trailer 14 includes a longitudinally extending upwardly opening trough-shaped frame, referred to in general by the reference numeral 18, extending rearwardly from the gooseneck tongue 16 and including a plurality of transversely spaced opposite side interconnected frame members 20, 22, and 24 disposed on opposite sides of the longitudinal center line of the frame 18. The longitudinal members 24 comprise outer side longitudinal members and each set of longitudinal members 20, 22, and 24 are supported from centrally located opposite side, longitudinal guide channels 26 and 28.

The guide channels 26 and 28 are interconnected by means of longitudinally spaced transverse member 30, 32, and 34 spaced rearwardly along the frame 18 from the forward end thereof and one end of a long longitudinally extending hydraulic cylinder 36 is anchored to the transverse member 32. The other end of the cylinder 36 is anchored to the rear transverse member 38 of an elongated slide 40 slidably supported from the channel members 26 and 28 and including a forward upstanding abutment 42. Accordingly, the hydraulic cylinder 36 may be selectively actuated to cause rearward and forward shifting of the slide 40 within the guide channels 26 and 28.

A central transverse axle assembly, referred to in general by the reference numeral 44, is supported from the frame 18 and includes opposite side wheels 46 journaled therefrom whereby the trailer 14 may be readily trailed over the ground 48 upon which the draft vehicle 10 is disposed.

The frame 18 includes a rigidly supported laterally outwardly projecting mount 50 on its left side forward of the axle assembly 44 and the outer end of the mount 50 supports an upstanding post 52 for oscillation about its longitudinal axis relative to the mount 50. A hydraulic cylinder 54 is connected between the channel member 28 and a swing arm 56 carried by the lower end of the post 52 and the cylinder 54 may, therefore, be utilized to oscillate the post 52 relative to the mount 50.

A horizontal arm, referred to in general by the reference numeral 58, includes a base end portion 60 oscillatably supported from the post 52 for angular displacement about a horizontal axis relative to the post 52 and a free end portion 62 journaled from the base end portion 60 for oscillation relative thereto. The base end portion 60 of the arm 58 is pivotally supported from the lower end of the post 52, as at 64, and a hydraulic cylinder 66 is connected between the upper end of the post 52 and the base end portion 60 of the arm 58 for oscillating the arm 58 between a lowered horizontal position and a raised inclined position with the outer end of the arm 58 elevated relative to the ground 48. A hydraulic cylinder 68 is connected between the base end portion 60 of the arm 58 and a lever arm 70 carried by the free end portion 62 of the arm 58 and is operative to oscillate the free end portion 62 of the arm 58 about its longitudinal axis relative to the base end portion 60 of the arm 58.

The free end portion 62 of the arm 58 includes a ground engageable support wheel 72 journaled from its free end portion and a plurality of round bale impaling spikes 74 spaced therealong and projecting forwardly of the trailer 14 when the arm 58 is in a position disposed substantially normal to the longitudinal center line of the frame 18. Further, an upstanding brace assembly 76 is carried by the free end portion 62 and disposed at substantially 90° relative to the spikes 74.

The forward ends of the right side longitudinal members 22 and 24, only, are inwardly and downwardly inclined as at 78 and 80 and joined to the channel member 28 and the outer end portion 62 of the arm 58 is swingable into position in registry with downwardly and inwardly inclined portions 78 and 80 of the longitudinal members 22 and 24 when the arm 58 is lifted and swung forwardly to a position closely paralleling the left side of the forward end of the frame 18.

The slide 40 includes a plurality of longitudinally spaced pivotally supported and spring biased dogs 82 supported from the opposite sides thereof for a purpose to be hereinafter more fully set forth and the rear ends of the channel members 26 and 28 have a ramp member 84 slidably supported therefrom for movement between front and rear positions. The ramp member 84 is disposed, when in its forwardmost position, forwardly of the rear end of the frame 18 and projects substantially fully beyond the rear end of the frame 18 when in the rear position thereof. In addition, the forward end of the ramp 84 is slidably and pivotally supported from the channel members 26 and 28 in a manner such that when the ramp 84 reaches its rearmost position, the rear end of the ramp 84 may swing downwardly into contact with the ground. The ramp 84 is spring biased toward its forwardmost position and is engageable by a cylindrical hay bale disposed on the rear end of the frame 18 during rearward movement of the hay bale relative to the frame 18 for shifting the ramp 84 from its forwardmost position to its rearwardmost hay bale discharging position whereby the rearmost hay bale on the frame 18 may be rearwardly displaced therefrom down the ramp 84 and onto the ground 48, even while the trailer 14 is being moved forwardly over the ground 48.

In operation, the trailer 14 is forwardly advanced along a row of cylindrical hay bales disposed on the ground 48. It is to be understood that the round hay bales will be horizontally disposed and extend transversely of the row in which they are disposed.

As the trailer 14 is advanced along a row of cylindrical hay bales with the arm 58 in its rear transversely extending position, the arm 58 is laterally forwardly advanced toward a hay bale and the members 74 engage and impale the hay bale. Thereafter, the cylinder 68 is actuated so as to rotate the outer end portion 62 of the arm 58 toward a position with the tines 74 and brace assembly or frame 76 defining an upwardly opening trough in which the cylindrical hay bale is cradled. Thereafter, the hydraulic cylinder 54 is extended so as to swing the arm 58 forwardly toward the position thereof illustrated in FIGS. 6, 7 and 8 and the cylinder 66 may be contracted so as to cause the outer end portion 62 of the arm 58 to be elevated above the ground 48. Thereafter, when the impaled and elevated cylindrical hay bale is positioned closely adjacent the left side of the forward end of the frame 18, the cylinder 68 is contracted so as to rotate the outer end portion 62 of the arm 58 to a position with the tines 74 in a slightly downwardly inclined position thus enabling the cylindrical hay bale to roll freely from a supported position on the arc 58 into the upwardly opening trough defined by the frame 18. Thereafter, the cylinders 54, 66 and 68 are returned to their starting positions in readiness to engage and lift the next cylindrical bale encountered and the cylinder 36 is extended so as to rearwardly shift the slide 40 whereby the upstanding abutment 42 carried by the slide 40 may rearwardly displace the initial hay bale positioned on the frame 18 along the latter.

Of course, the next hay bale engaged and supported by the arm 58 is discharged into the forward end of the trough defining frame 18 and the cylinder 36 is again actuated to rearwardly displace the slide 40 whereby the two cylindrical hay bales then supported by the frame 18 will be displaced rearwardly therealong. In order to assist rearward displacement of a plurality of hay bales supported from the frame 18 rearwardly therealong, the spring biased dogs 82 carried by the slide 40 are operative to engage individual bales supported from the frame 18 and to retract downwardly out of engagement with the bales when the slide 40 is returned to its forwardmost position subsequent to being rearwardly displaced in order to rearwardly shift hay bales supported on the frame 18.

The process of engaging, picking up and depositing hay bales on the frame 18 may be repeated until the entire length of the frame 18 is occupied by four or more cylindrical hay bales. Thereafter, further rearward displacement of the frame 40 will cause the rearwardmost hay bale supported from the frame 18 to be rearwardly discharged therefrom downwardly along the then rearwardly displaced and downwardly inclined ramp 84. The slide 40 may be successively actuated to complete rearward discharging of all of the bales supported on the frame from the rear end thereof.

With attention now invited more specifically to FIGS. 10, 11, and 12 of the drawings, there may be seen a modified form of trailer referred to in general by the reference numeral 114 and including a main frame referred to in general by the reference numeral 118. The trailer 114 is similar in many respects to the trailer 14 and the components of the trailer 114 which comprise identical or similar components to those utilized in the trailer 14 are designated by corresponding reference numerals in the 100 series.

The outer end portion 162 of the arm 158 includes a support frame referred to in general by the reference numeral 173 and comprising a pair of upstanding channel members 175 rigidly supported from the outer end portion 162 of the arm 158 and opening toward each other. The channel members 175 slidingly support an upstanding frame referred to in general by the reference numeral 177 therefrom and consisting of a pair of upstanding opposite side members 179 slidably supported from the channel members 175 and interconnected at their upper ends by means of an upper horizontal connecting member 181. Further, a hydraulic cylinder 183 is operatively connected between the outer end portion 162 of the support arm 158 and the upper horizontal connecting member 181 of the frame 177, whereby the frame 177 may be raised and lowered relative to the channel members 179. The lower ends of the members 179 are interconnected by means of a lower horizontal member 185 secured and extending therebetween and the lower end portions of the channel members 175 are interconnected by means of a horizontal brace 187 extending and secured therebetween. The brace 187 includes a plurality of depending posts 189 spaced therealong and the member 185 includes a plurality of lifting fork tines 191 supported therefrom and including upwardly opening tubular members 193 in whose upper ends the lower ends of the posts 189 are telescopingly received. Accordingly, the lifting fork tines 191 may be advanced beneath cylindrical bale supported on the ground and the cylinder 183 may be expanded to cause the bale engaged by the tines 191 to be lifted from the ground 48. Further, the upper connecting member 181 includes forwardly projecting horizontal tines 195 for impaling the central portion of a cylindrical bale beneath which the tines 191 are advanced.

From the foregoing description of the first form of trailer 14 illustrated in FIGS. 1 through 9, it will be apparent that the trailer 114 operates in substantially the same manner with the major difference being that the tines 191 and 195 engage the bales to be loaded onto the trailer 114 in a slightly different manner. Further, in addition to the free end portion 162 of the arm 158 being elevatable through the utilization of the cylinder 166, the frame 177 supporting the tines 191 and 195 may be elevated relative to the arm 158.

Referring now more specifically to FIGS. 13 through 15, there will be seen a third form of trailer referred to in general by the reference numeral 214. The trailer 214 is substantially similar to the trailer 14, except that in lieu of the tines 74 and the frame 76, the outer end portion of the free end portion 262 of the arm 258 corresponding to the arm 58 includes a fixed outer clamp arm 271 and a second inner clamp arm 273 is slidably mounted on the outer end portion 262 of the arm 258, but keyed thereto by a key 275 for angular displacement therewith relative to the inner end portion 260 of the arm 258. Also, a hydraulic cylinder 277 is operatively connected between the outer end portion 262 and the inner clamp arm 273 for shifting the latter toward and away from the outer fixed clamp arm 271. Accordingly, it may be seen that a cylindrical bale 279 may be clamped between the arms 271 and 273 and that the operation of the trailer 214 is otherwise similar to the operation of the trailer 14.

The foregoing is considered as illustrative only of the principles of the invention. Further, since numerous modifications and changes will readily occur to those skilled in the art, it is not desired to limit the invention to the exact construction and operation shown and described, and accordingly all suitable modifications may be resorted to, falling within the scope of the invention.

What is claimed as new is as follows:

1. In combination, an elongated horizontal frame for receiving hay bundles thereon, said frame including ground engageable support structure for support of said frame from the ground and longitudinal advancement of said frame thereover, an elongated generally horizontal arm, support means supporting one end portion of said arm from said frame for horizontal swinging of the other end of said arm about an upstanding axis relative to said frame between a first position with said arm projecting outwardly from one side of said frame and a second position with said arm closely paralleling said frame with a first side of said arm opposing said frame, hay bundle engaging means supported from the other end portion of said arm and projecting outwardly from said first side thereof, at least the outer portion of said hay bundle engaging means being adapted to supportively engage a ground supported hay bundle toward which said one side of said arm is laterally advanced into close proximity with said hay bundle, elevating means supporting said hay bundle engaging means from said arm for up and down movement of at least the outer portion of said hay bale engaging means relative to said arm, said frame, at a point spaced along said one side thereof from said axis a distance substantially equal to the spacing of said hay bundle engaging means along said arm from said axis, being structured to receive thereon a hay bundle supported from said hay bundle engaging means outer portion when the latter is in an elevated position and said arm is swung from said first position to said second position.

2. The combination of claim 1 wherein said frame includes front and rear ends adapted to lead and trail, respectively, relative to the intended longitudinal advance of said frame over the ground, said arm, when in said second position, projecting forwardly of said axis.

3. The combination of claim 2 wherein said frame includes hay bundle support means adapted to support hay bundles therefrom for rearward shifting from said point, along said frame, and bundle shifting means carried by said frame and operative to engage a bundle supported on said frame at said point and shift the engaged bundle rearwardly along said frame a distance sufficient to allow a subsequent bundle to be supported on said frame at said point.

4. The combination of claim 1 wherein said support means also includes means supporting said one end portion of said arm for angular displacement relative to said frame about a second horizontal axis extending transversely of said arm and angularly displaceable therewith during swinging of said arm about the first mentioned axis, and motor means operatively connected between said arm and frame for selectively raising and lowering said outer end thereof.

5. The combination of claim 1 including motor means operatively connected between said arm and frame for selectively angularly displacing said arm about said upstanding axis.

6. The combination of claim 1 wherein the outer end of said arm includes ground engageable support wheel means journalled therefrom for rotation about an axis generally paralleling said arm.

7. The combination of claim 6 where said support means also includes means supporting said one end portion of said arm for angular displacement relative to said frame about a second horizontal axis extending transversely of said arm and angularly displaceable therewith during swinging of said arm about the first mentioned axis, and motor means operatively connected between said arm and frame for selectively raising and lowering said outer end thereof.

8. The combination of claim 7 including motor means operatively connected between said arm and frame for selectively angularly displacing said arm about said upstanding axis.

9. The combination of claim 1 wherein said hay bundle engaging means is mounted on said arm for vertical rectilinear shifting relative thereto, and means connected between said arm and said hay bundle engaging means for raising and lowering the latter relative to said arm.

10. The combination of claim 9 wherein said elevating means includes an outer end portion of said arm mounted on said one end portion for angular displacement relative thereto about an axis extending longitudinally of said arm, said hay bundle engaging means being mounted on said outer end portion for angular displacement therewith, and motor means operatively connected between said one end portion of said arm and the outer end portion thereof for selectively angularly displacing said outer end portion relative to said one end portion.

11. The combination of claim 1 wherein said elevating means includes an outer end portion of said arm mounted on said one end portion for angular displacement relative thereto about an axis extending longitudinally of said arm, said hay bundle engaging means being fixedly mounted on said outer end portion of said arm and said outer portion of said hay bundle engaging means being spaced radially outwardly of the last mentioned axis.

12. The combination of claim 1 wherein said elevating means includes an outer end portion of said arm mounted on said one end portion for angular displacement relative thereto about an axis extending longitudinally of said arm, said hay bundle engaging means comprising a first generally radially extending jaw carried on one end portion of the outer end of said arm and a second generally radially extending jaw generally paralleling said first jaw and mounted on the other end portion of said outer end portion of said arm for movement toward and away from said first jaw for clamping a hay bundle between the opposing surfaces of said jaws, and motor means operatively connected between said second jaw and said outer end portion of said arm for selectively shifting said second jaw therealong.

* * * * *